March 3, 1953 S. H. GREENE 2,629,891
FULL SWEEP WINDSHIELD WIPER
Filed March 18, 1950
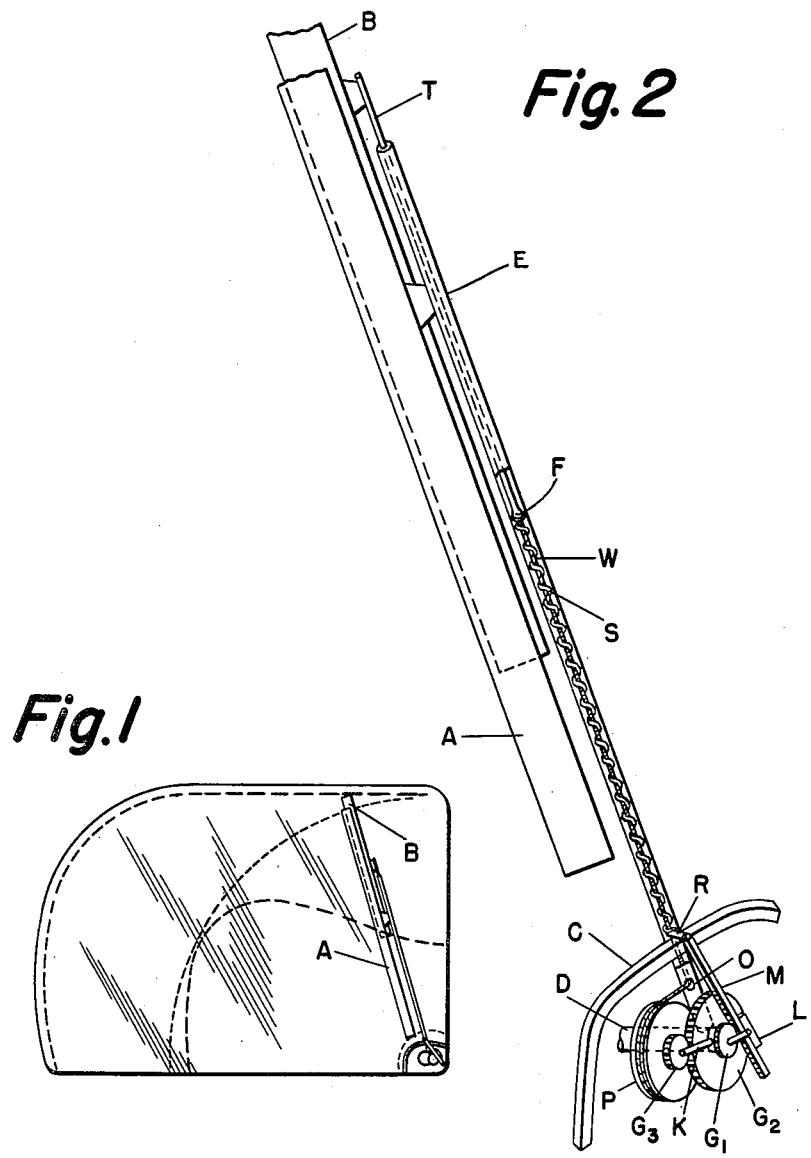
INVENTOR.
SYLVAN HARRISON GREENE
BY Arthur N. Klein
ATTORNEY Patented Mar. 3, 1953

2,629,891

UNITED STATES PATENT OFFICE 2,629,891

FULL SWEEP WINDSHIELD WIPER

Sylvan Harrison Greene, Philadelphia, Pa.

Application March 18, 1950, Serial No. 150,470

3 Claims. (Cl. 15—253)

The present invention relates generally to windshield wipers for use in automobiles and the like; and it relates more particularly to windshield wipers of the type in which a wiping blade is mounted at the end of a wiper arm and is moved back and forth across the surface of the windshield in a generally arcuate path.

An object of the present invention is to provide a new and improved windshield wiper construction which operates more effectively in that it sweeps substantially the entire surface of the windshield regardless of the shape or configuration thereof, so as to give the operator of the automobile or the like a completely clear and unobstructed view through the whole of the windshield during stormy weather in which such view is most necessary. Other objects and advantages of the present invention are apparent in the following detailed description, appended claims and accompanying drawings.

The conventional windshield wiper consists of a single blade fixedly mounted at one end of, and parallel to, an oscillating arm so that the blade describes a reciprocating path with the outer and inner tips of the blade moving along different-radius circular paths. Since the windshield customarily has an appreciably different configuration, customarily generally rectangular with an enlarged horizontal dimension to ensure maximum road visibility, it necessarily follows that the conventional wiper cannot wipe the entire surface of the windshield, leaving a substantial portion of the windshield obscured during storm conditions, just when hazardous road surfaces and lowered visibility outside require use of the complete windshield surface by the operator of the automobile in perceiving obstructions and oncoming objects.

Accordingly, it is an object of the present invention, as stated above, to provide a new and improved windshield wiper construction in which these shortcomings are overcome and in which the entire windshield surface is swept, regardless of shape. Generally speaking, this is accomplished by providing an auxiliary wiper blade mounted along side of, and generally parallel to, the conventional fixed blade, and constructed and arranged to be reciprocated in and out generally radially during the arcuate reciprocation of the wiper arm and the fixed blade, the radial reciprocation of the auxiliary being effected through the action, inter alia, of a pattern cam corresponding in shape to the contour of the windshield, so that the auxiliary blade, in extended position wherein it only partially overlaps the main blade, will sweep those portions of the windshield which are not reached by the main blade.

For the purpose of illustrating the invention, a preferred embodiment is shown and described herein, it being understood, however, that the invention is not limited to the precise arrangements and instrumentalities disclosed.

Referring to the accompanying drawings in which like reference characters indicate like parts throughout:

Figure 1 is an elevational view of the wiper of the present invention shown mounted at the lower right-hand corner of the left or driver's pane of a windshield.

Figure 2 is an enlarged schematic perspective view of the wiper and driving mechanism, parts being broken away better to reveal the construction thereof.

In the embodiment of Figs. 1 and 2, the main blade A of the wiper is fixedly mounted upon the outside of a tubular wiper-arm E somewhat inward of the free end of said wiper-arm so that the blade A extends generally parallel to, and outward somewhat beyond, said wiper-arm in conventional manner.

An auxiliary blade B is mounted at the end of a rod T which is slidably disposed within the tubular wiper-arm E but protrudes somewhat beyond the free end thereof; the auxiliary blade B being disposed in generally parallel, side-by-side relationship to the main blade A. As indicated in Fig. 1, the auxiliary blade B may be shorter than the main blade A with its outer end generally adjacent the outer end of the main blade A when the rod T is in its innermost retracted position relative to the tubular wiper-arm E.

The wiper-arm E is fixedly connected to a drive shaft D which is oscillated about its axis by a motor (not shown) in conventional manner to impart generally arcuate oscillation to the wiper-arm in customary fashion.

Disposed within the tubular wiper-arm E is a helical spring S, the outer end of which bears against the enlarged inner end F of the rod T and urges said rod to outer extended position relative to the wiper-arm. The inner end of the spring S is attached to a cam-follower roller R and urges it against a cam-track or guide C, the configuration of which corresponds, on a reduced scale (for example, a scale of 1:9), to the outer periphery or contour of the windshield, so that, as the wiper-arm oscillates, the cam-follower roller R copies the contour of the windshield in vertical and horizontal displacement.

A thin, flexible wire W is fastened, at one end, to the enlarged inner end F of the rod T, and extends inward therefrom within the tubular wiper-arm E and the helical spring S, emerging through an opening O formed in the wiper-arm somewhat outward of its point of connection to the drive shaft D, the remainder of the wire W being stored on, and secured to, a spool P which is rotatably mounted at the free end of a spoke K, the other end of which is fastened to the drive shaft D in fixed angular relationship to the wiper arm E.

The spool P is provided with a small gear wheel G-3 disposed in keyed, co-axial relationship therewith and meshing with a larger gear wheel G-2, which is co-axial with the shaft D but freely rotatable relative thereto. A small spur-gear G-1 is keyed to the gear wheel G-2, in co-axial relationship therewith, and meshes with a rack or gear arm M, the spur-gear and gear arm being connected by a clamp L which holds the two in engaged position but permits tangential movement of the gear arm relative to the spur-gear.

The free end of the gear arm M is connected to the roller R, so that movement of the roller along the guide C causes linear movement of the gear arm M and rotation of the spur-gear G-1, the gear wheels G-2 and G-3, and the spool P.

The length of the wire W is such that, when the roller R is closest to the center of the spur-gear G-1 (that is, when the wiper arm E is in generally vertical position), the rod T is restrained (against the pressure of the spring S) in its innermost retracted position relative to the wiper arm E.

As the drive shaft D rotates counterclockwise in Figs. 1 and 2, the wiper arm E and the roller R move toward the left. This increases the distance between the roller R and the center of the spur-gear G-1 and causes upward tangential movement of the gear arm M, which in turn causes counterclockwise rotation of the spur-gear G-1 and the larger gear wheel G-2 and clockwise rotation of the smaller gear wheel G-3 and the spool P. This unwinds and pays off some of the wire W and permits the rod T to be moved outward somewhat relative to the tubular wiper arm E under the action of the spring S.

The gear system (M, G-1, G-2, G-3 and P) is constructed and arranged to produce an increased peripheral rotation of the spool P relative to the linear tangential movement of the arm M corresponding inversely to the scale of the guide C relative to the contour of the windshield. That is, if the scale of the guide to the windshield contour is 1:9, for example, the scale of peripheral rotational (unwinding or winding) movement of the spool P to the linear tangential movement of the arm M should be 9:1.

It is apparent, therefore, that, as the roller R moves along the guide C during oscillation of the wiper arm E, the rod T will be extended and retracted relative to the wiper arm so as to keep the upper tip of the auxiliary blade B closely adjacent the outer and upper periphery of the windshield and to sweep those portions of the windshield which are not reached by the main blade A. In other words, the main blade A sweeps that portion or zone of the windshield indicated at A' in Fig. 1, while the auxiliary blade B sweeps that portion or zone indicated at B'. Since the two zones overlap throughout, the entire windshield surface is swept during each swing of the arm E.

The present invention may be embodied in other specific forms and, accordingly, the above-described embodiment is to be considered merely as illustrative and not restrictive, reference being made to the appended claims, rather than to the foregoing description, as indicating the scope of the invention.

I claim:

1. A windshield wiper comprising a drive shaft, a wiper arm mounted on said drive shaft and extending radially therefrom and adapted to be reciprocated thereby, a main wiper blade fixedly connected to said wiper arm and adapted to sweep a generally arcuate zone of the windshield during reciprocation thereof, an auxiliary blade disposed in generally parallel side-by-side relationship to the main wiper blade and connected to said wiper arm in radially movable relationship thereto, said auxiliary wiper blade being spring urged radially outwardly and being provided with a restraining wire, a rotatable storage spool for said restraining wire, and means for alternately winding and unwinding said storage spool during reciprocation of said wiper arm so as to cause radial movement of the auxiliary wiper blade and thereby to enable said auxiliary wiper blade to be progressively extended as the wiper arm departs from vertical position and to sweep substantially the entire zone of the windshield not reached by the main blade, said last-mentioned means comprising a cam guide corresponding, on a reduced scale, to the contour of the windshield, a cam follower constructed and arranged to be moved along said cam guide during reciprocation of said wiper arm, a gear arm connected at one end to said cam follower and adapted to be actuated thereby, and a gear train operatively connecting said gear arm and said storage spool for rotating said spool responsive to linear movement of said gear arm, said gear train including a spur-gear disposed in axial alignment with the drive shaft and with which the gear arm makes tangential connection, and a pair of step-up gear wheels intermediate said spur-gear and said spool whereby the extent of movement of the cam follower away from the drive shaft is magnified in the extent of linear unwinding movement of the wire.

2. A windshield wiper comprising a drive shaft constructed and arranged to be reciprocated about its axis, a tubular wiper arm mounted on said drive shaft and extending generally radially therefrom and adapted to be oscillated thereby, said wiper arm having an opening adjacent its point of connection to said drive shaft, a main wiper blade fixedly mounted on said arm and adapted to be swept back and forth thereby along a generally arcuate zone, a rod slidably disposed within said tubular wiper arm and protruding from the free end thereof, an auxiliary wiper blade mounted on the protruding end of said rod in generally parallel side-by-side relationship to the main wiper blade, a spring disposed within said tubular wiper arm and constructed and arranged to urge said rod to outer extended position, a restraining wire connected to the inner end of said rod and extending through said wiper arm and emerging therefrom through the opening therein, a spoke mounted on and extending radially from said drive shaft in angular relationship to said wiper arm, a spool and a small gear wheel rotatably mounted on the end of said spoke, said restraining wire being stored on said spool and being payed out or taken in upon rotation thereof so as to permit radial extension or retraction of said rod and auxiliary blade relative to said wiper arm and said fixed main blade, a larger gear wheel meshing with said small gear wheel and a spur-gear keyed to said larger gear wheel, said larger gear wheel and spur-gear being rotatably mounted in axial alignment with said drive shaft, a gear arm meshing with said spur-gear in tangential relationship thereto, a cam-follower roller connected to one end of said gear arm and constructed and arranged to move with said wiper arm and to carry said gear arm along therewith, a cam guide mounted in spaced relationship to said drive shaft and having a contour corresponding, on a reduced scale, to the outer contour of the windshield, and spring means urging said roller against said cam guide, movement of said roller along said cam guide during oscillation of said wiper arm causing tangential movement of said gear arm relative to said spur-gear resulting in rotation of the spur-gear, gear wheels and spool, thereby to enable the auxiliary wiper blade to wipe that zone of the windshield not reached by the main wiper blade, the restraining wire being payed out as the wiper arm moves away from its upright vertical position to an extent sufficient to enable the end of the auxiliary wiper blade to follow the outer contour of the windshield regardless of the shape thereof.

3. A construction according to claim 2 wherein the spring disposed within the tubular wiper arm is seated against the roller and serves as the spring means urging the roller against the cam guide.

SYLVAN HARRISON GREENE.

REFERENCES CITED

The following references are of record in the file of this patent:

UNITED STATES PATENTS

| Number | Name | Date |
| --- | --- | --- |
| 860,021 | Fesenfeld | July 16, 1907 |
| 1,660,971 | Lindner | Feb. 28, 1928 |
| 2,494,408 | Rice | Jan. 10, 1950 |

FOREIGN PATENTS

| Number | Country | Date |
| --- | --- | --- |
| 804,428 | France | Aug. 3, 1936 |
| 827,531 | France | Jan. 28, 1938 |